Aug. 9, 1932.        D. BEILOCK        1,870,276
TOOTHBRUSH HOLDER
Filed Oct. 16, 1931        2 Sheets-Sheet 1
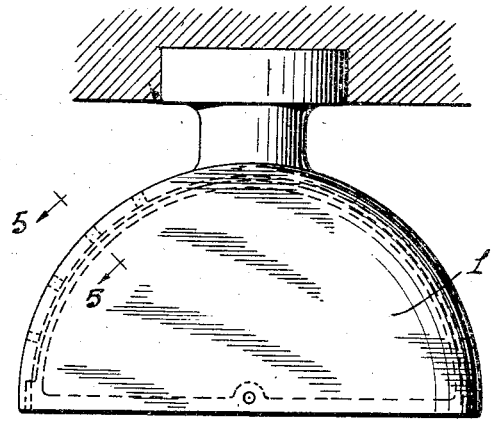
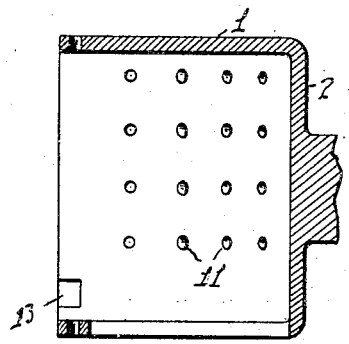
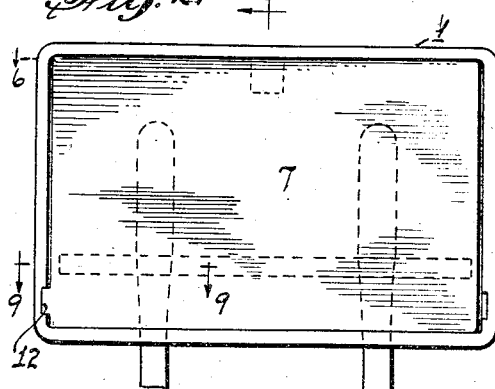
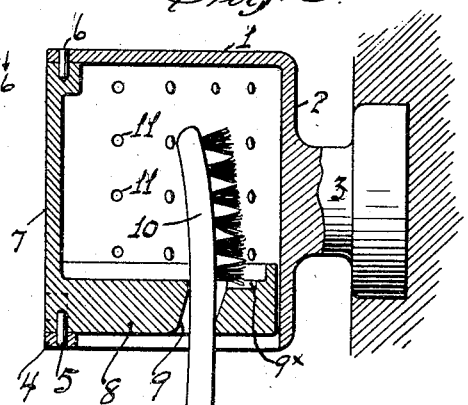
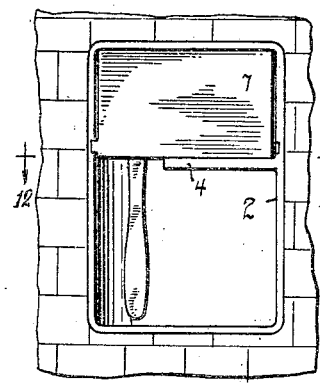
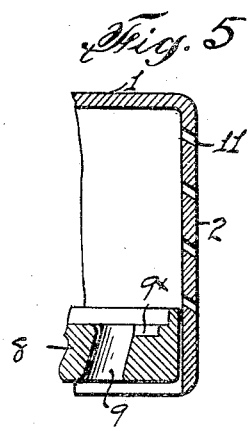
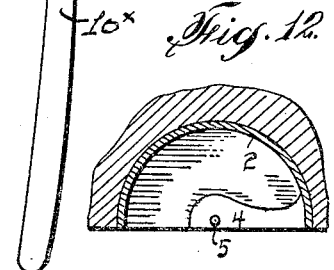
INVENTOR
David Beilock
BY
ATTORNEY Aug. 9, 1932.  D. BEILOCK  1,870,276
TOOTHBRUSH HOLDER
Filed Oct. 16, 1931  2 Sheets-Sheet 2
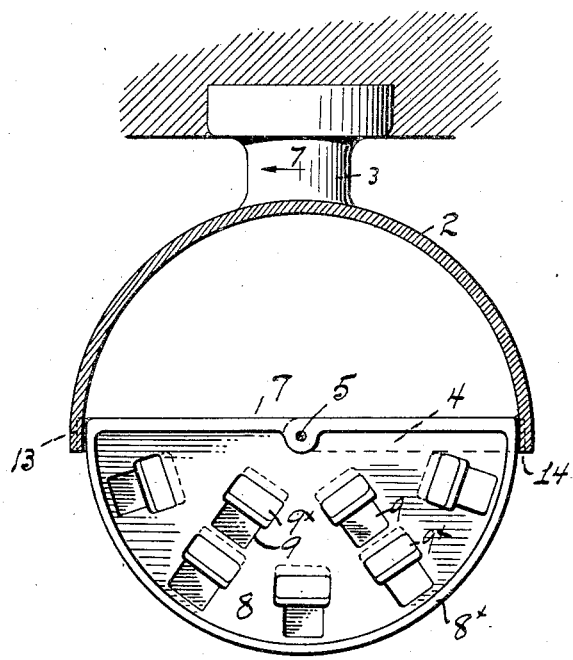
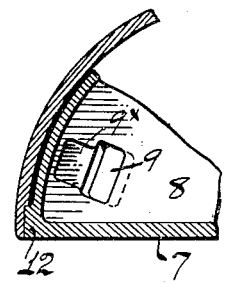
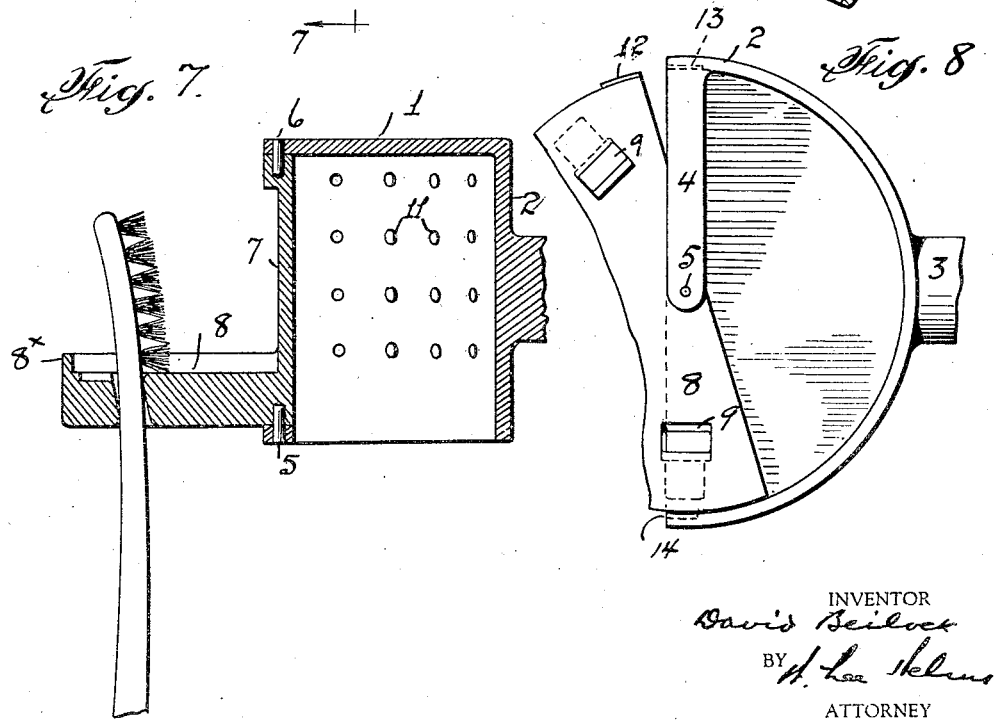
INVENTOR
David Beilock
BY
ATTORNEY Patented Aug. 9, 1932

1,870,276

UNITED STATES PATENT OFFICE

DAVID BEILOCK, OF NEW YORK, N. Y.

TOOTHBRUSH HOLDER

Application filed October 16, 1931. Serial No. 569,169.

The object of the present invention is to provide a holder for a plurality of tooth brushes, adapted to be secured to a wall or other supporting surface and to enclose the upper or brush end of the tooth brushes the handles depending below the device and the base of the holder being so formed the brush-carrying element may be rotated to bring the brushes into position for removal or repositioning.

The invention will be described with reference to the accompanying drawings in which Figure 1 is a plan view of an embodiment of the invention.

Figure 2 is a view in elevation of the invention.

Figure 3 is a transverse sectional elevation on the line 3—3, Fig. 2.

Figure 4 is a view similar to Fig. 3 with the rotary holding element removed.

Figure 5 is a fragmentary sectional elevation on the line 5—5, Fig. 1.

Figure 6 is a sectional plan view on the line 6—6, Fig. 2.

Figure 7 is a sectional elevation on the line 7—7, Fig. 6.

Figure 8 is a bottom plan view of the device the rotary holder being shown partly broken away.

Figure 9 is a fragmentary horizontal section on the line 9—9, Fig. 2 showing the left-hand side of the device.

Figure 10 is a similar view showing the right-hand side of the device with the rotary holder swung outward in position for expositing the brushes.

Figure 11 is a plan view of a modification in that the casing for the apparatus constitutes a hollow tile block for insertion in the wall of a bathroom.

Figure 12 is a horizontal section on the line 12—12, Fig. 11.

Referring to the drawings it will be seen that the embodiment of the invention therein illustrated comprises an outer casing which is of semi-circular form the top wall being indicated at 1, the semi-circular side wall at 2 and the holding or bracket arm at 3.

The base of the casing is entirely open with the exception of an axial arm 4 projecting from and carried by the side wall 2 of the casing. The front of the casing is open.

Pivoted at 5 to arm 4 and at 6 to the top wall 1 of the casing, is a rotary holder comprising a flat front plate 7 and a semi-circular supporting plate 8 carried thereby, preferably having a vertical flange 8x. Plate 8 is formed with a plurality of inclined apertures 9 for the passage of the handles 10x of brushes 10. At one side of each aperture 9 is a depression or seat 9x to receive the lower bristle portion of the brush. When the brushes are inserted they lie in the position illustrated in Fig. 3 although the device is entirely operative with the brushes in the position illustrated in Fig. 7.

I preferably form the casing wall 2 with a plurality of openings 11 for the passage of air, the openings being directed upwardly as shown in Fig. 5 so as to guard against the passage of dust within the container.

The front wall 7 of the rotary holder may be provided with a side lug 12 to enter a recess in wall 2 of the casing member and engage the inner wall of the recess, the latter affording a stop. The recess is indicated at 13 in the drawings. When the holder is swung to exposed position as shown in Fig. 6, lug 12 may enter a similar recess 14 formed in wall 2 of the casing to engage the inner wall of the recess as a stop, as more particularly shown in Fig. 10.

In the operation of the device the brushes are placed in their respective apertures in the rotary holder preferably with the brush portions located in the seats 9x and then the holder is rotated to bring wall 7 outermost and close the casing. Air may pass into the casing through the apertures 11, dry the brushes after use and the inclined slots will serve to retard the passage of dust. When the casing is closed by the wall 7, the holder plate 8 lying within the casing, plate 7 may be pressed inwardly at its right-hand end, Fig. 2, and thereby swung on its pivots 5 and 6 until the holder plate comes into view with the brushes and the parts lie as shown in Fig. 6, the primary characteristic of the casing being that it is so constructed as to support the rotary holder with the brush handles depending below the same and permitting their movement from an inner point to an outer point without impedance.

Having described my invention, what I claim and desire to secure by Letters Patent, is as follows:—

1. A holder for tooth brushes comprising a casing having a top wall, a side wall and a rigid supporting arm extending from the side wall, a rotary holder comprising a vertical wall and an angularly extending holding plate carried by said wall, the rotary holder being pivoted to said arm and to the top of the casing and the holding plate being formed with a plurality of apertures for the reception of tooth brushes with their handles depending below the casing, the arm being so positioned as to permit rotation of the holder to carry the holding plate within the casing and to position the vertical wall of the holder exteriorly of the plate relatively to the casing, the casing thus being closed at its front and bottom by the rotary holder.

2. A device constructed in accordance with claim 1 in which the casing is formed with a plurality of air inlets the air inlets being downwardly inclined relatively to the casing as and for the purpose set forth.

3. A device constructed in accordance with claim 1 in which the holding plate of the rotary holder is formed with inclined apertures and adjacent brush-receiving seats.

In testimony whereof, I have signed my name to this specification.

DAVID BEILOCK.